Oct. 11, 1949.                    W. BRAUER                    2,484,071
                                  LAWN MOWER
                               Filed April 1, 1946

INVENTOR.
WALTER BRAUER
BY
C. M. McKnight
ATT.

Patented Oct. 11, 1949

2,484,071

UNITED STATES PATENT OFFICE 2,484,071

LAWN MOWER

Walter Brauer, Ingleside, Tex.

Application April 1, 1946, Serial No. 658,649

1 Claim. (Cl. 56—294)

This invention relates to a cutting device and more particularly, but not by way of limitation, to a manually propelled lawn mower for cutting grass or the like.

It is an important object of this invention to provide an improved construction in a lawn mower which is lighter in weight, effecting an easier operation and consequently requiring less work to push the lawn mower.

And still another object of this invention is to provide an improved lawn mower which is simple in construction and provided with cutting discs of decreased diameter adapted to alternately cut one edge of a two-edged cutting tooth to increase the cutting torque and facilitate operation of the device.

And still another object of this invention is to provide an improved lawn mower having cutting discs of such size to permit cutting close to obstructions in the grass.

Other objects and advantages of the invention will be evident from the following detailed description, read in conjunction with the accompanying drawings, which illustrate my invention.

In the drawings, Figure 1 is a perspective view of the improved lawn mower.

Figure 1:
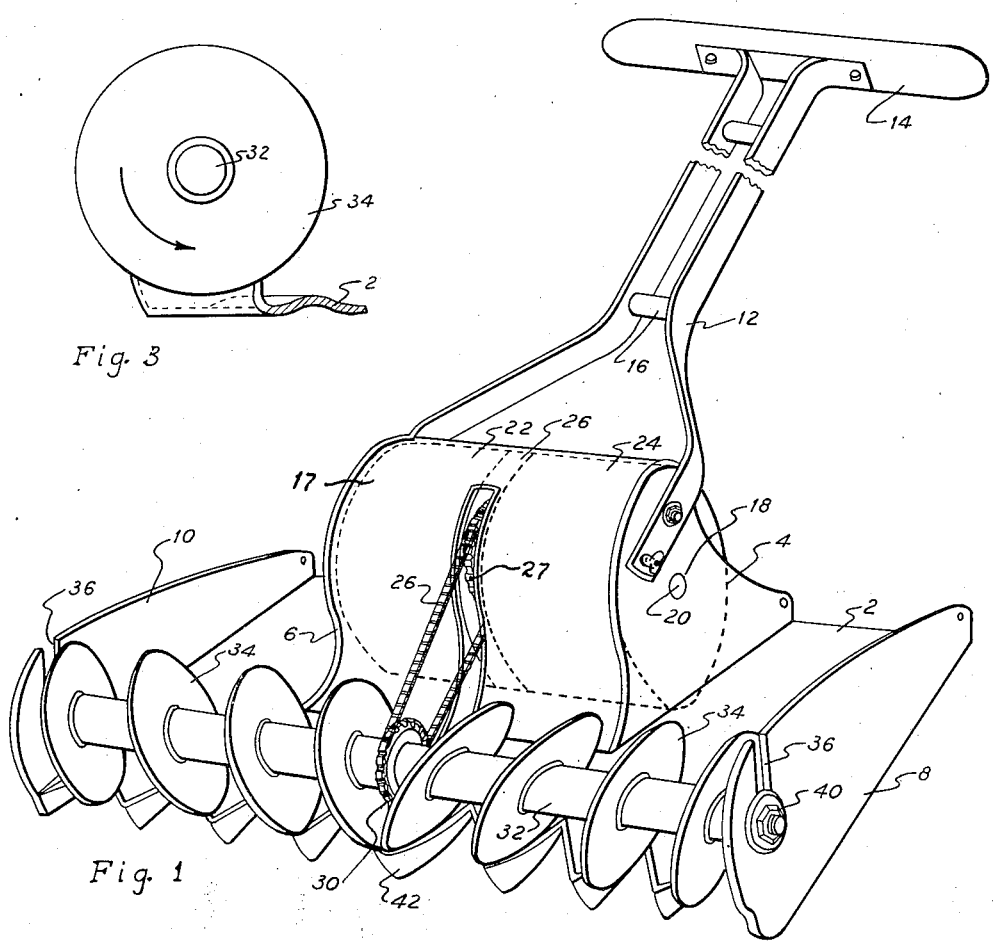
Figure 2:
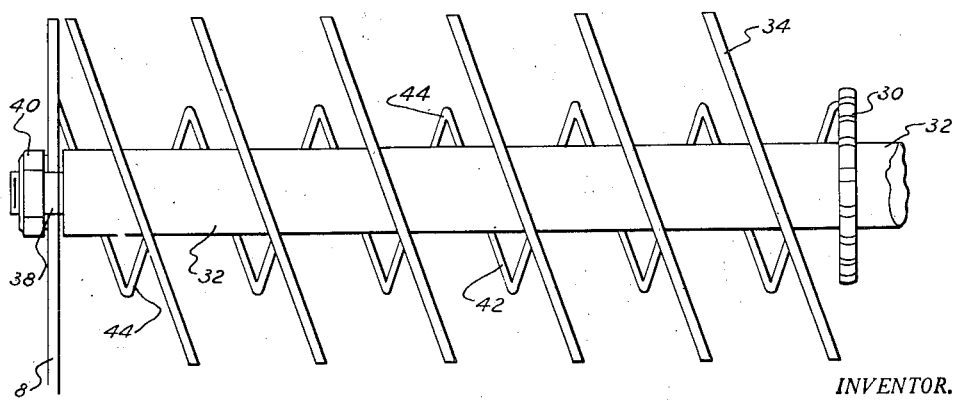
Figure 2 is a plan view in detail of a portion of the cutting discs cooperating with the cutting teeth.

Referring to the drawings in detail, and more particularly Figures 1 and 2, reference character 2 designates a substantially horizontal frame having upstanding inner side members 4 and 6 and upstanding outer side members 8 and 10. It will be apparent that the frame member 2 may be utilized as an apron for catching the cut grass as will be hereinafter set forth. The frame 2 is disposed substantially parallel with the ground. A pair of yoke members 12 are secured to the side members 4 and 6, and extend outwardly therefrom to receive a guiding handle 14. The yoke members 12 are provided with supporting braces 16. The side members 4 and 6 form side sections of a roller housing 17 and are provided with aligned apertures 18, only one of which is shown, for receiving a freely rotatable drive shaft 20 in turn supporting a pair of rollers 22 and 24. The rollers are separated at 26 to provide a clearance for a sprocket 27 mounted on the drive shaft 20. The sprocket is connected by a chain 28 to a co-operating sprocket 30 mounted on a cutter shaft 32 supporting the cutting discs 34, as will be hereafter set forth.

Figure 3:
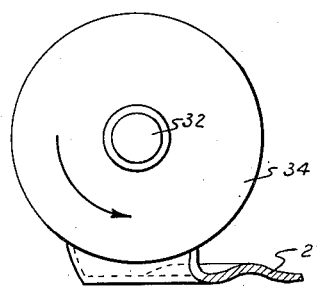
Figure 3 is a side view of the cutting discs.

The outer side members 8 and 10 are provided with aligned grooves 36 for receiving the reduced end portions 38 of the freely rotatable disc shaft 32, and are held therein by suitable locking means 40. The front portion of the frame 2 is formed with transversely disposed cutting teeth 42 of substantially V-shape, with a cutting edge 44 on each side of the V. The shaft 32 is provided with a plurality of fixed cutting discs 34 which are elliptical in shape. The discs 34 on one side of the sprocket 30 are mounted at an angle to the longitudinal axis of the shaft 32 in a direction opposite from the angular disposition of the discs 34 on the opposite side of the sprocket 30. It will be apparent from Figure 3 that when viewed along the axis of the shaft 32, the cutting discs appear as of true circular shape. The V-shaped cutting teeth 42 have contours formed along their cutting edges 44 to conform to the true circular shape of the cuttings discs 34.

The cutting discs are disposed along the shaft 32 above the teeth 42 in such a manner that as the discs are rotated by the shaft 32 due to the sprocket connection with the rollers 22 and 24, the cutting edge of a disc 34 alternately contacts the adjacent cutting edge 44 of a tooth 42. In such manner, forward or reverse movement of the device will cause grass to enter between the V-shaped teeth, whereupon the grass will be cut first on one cutting edge 44 of teeth 42 and then on the opposite edge by the rotating elliptical discs alternately contacting each cutting edge of the V-shaped teeth. The cut grass is preferably thrown on the apron frame 2.

From the foregoing it will be apparent that the elliptical shape and angular disposition of the cutting discs rotated by the shaft 32 causes an alternate contact with the adjacent cutting edge of the V-shaped teeth, thereby providing a side-cutting principle which will increase the cutting torque between the discs and the teeth and effect an ease of operation which necessarily will require less work to push the lawn mower along the ground. Furthermore, the overall light weight and the small size of the cutting discs assist in facilitating the operation of the mower. The ratio of the drive rollers speed of rotation to that of the cutting disc shaft is such to permit a continuous cutting action upon movement of the lawn mower along the ground.

The invention has disclosed only a manual operation by pushing the device along the ground to cause actuation of the rollers 22 and 24; however, it will be apparent that the cutting unit may be made automatic by including any source of motive power to actuate the rollers 22 and 24 with a cooperative actuation of the shaft 32 and cutter discs 34.

Changes may be made in the specifications and drawings without departing from the spirit of the invention within the scope of the following claim as set forth.

What I claim is:

In a grass cutting device comprising in combination a frame having a rearwardly extending apron, and cutting means carried by the frame, a main shaft supported by the frame, driving rollers carried by the shaft, a sprocket wheel carried on said shaft, a cutter shaft supported by the frame, means operably connecting the cutter shaft with the sprocket wheel, a plurality of V-shaped teeth disposed transversely on the frame, a plurality of elliptical shaped cutting discs disposed on the cutter shaft and arranged at an angle to the longitudinal axis thereof, a number of said cutting discs arranged on the shaft in one direction, the remaining number of said cutting discs arranged in an opposite direction, said cutter shaft adapted to rotate upon movement of the rollers to provide alternate contact of the cutter disc with an adjacent cutting edge of the V-shaped teeth, and said apron receiving the cuttings.

WALTER BRAUER.

REFERENCES CITED

The following references are of record in the file of this patent:

UNITED STATES PATENTS

| Number | Name | Date |
|---|---|---|
| 1,762,287 | Blair | June 10, 1930 |
| 2,282,238 | Newton | May 5, 1942 |